(12) United States Patent
Vilard et al.

(10) Patent No.: US 6,972,805 B2
(45) Date of Patent: Dec. 6, 2005

(54) DISPLAY OF A VIDEO SIGNAL BY MEANS OF A LINE SCAN

(75) Inventors: Philippe Vilard, Houilles (FR); Marnik Bogaert, Bruges (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 445 days.

(21) Appl. No.: 09/793,034

(22) Filed: Feb. 26, 2001

(65) Prior Publication Data

US 2001/0030712 A1 Oct. 18, 2001

(30) Foreign Application Priority Data

Feb. 29, 2000 (FR) .................................. 00 02557

(51) Int. Cl.⁷ ............................. H04N 5/68; H04N 3/32
(52) U.S. Cl. ...................... 348/626; 348/625; 348/776; 348/380; 315/371
(58) Field of Search ............................... 348/626, 625, 348/776, 805, 809, 687, 725, 380, 379; 315/371, 315/399

(56) References Cited

U.S. PATENT DOCUMENTS

| | | | | |
|---|---|---|---|---|
| 4,261,014 A | * | 4/1981 | Lee ............................... | 348/627 |
| 4,309,725 A | * | 1/1982 | Groeneweg ................. | 348/626 |
| 5,072,300 A | * | 12/1991 | Anderson .................... | 348/626 |
| 5,093,728 A | * | 3/1992 | Altmanshofer .............. | 348/626 |
| 5,164,829 A | * | 11/1992 | Wada .......................... | 348/626 |
| 5,179,320 A | * | 1/1993 | Tripod ......................... | 315/399 |
| 5,196,941 A | * | 3/1993 | Altmanshofer .............. | 348/626 |
| 5,351,094 A | * | 9/1994 | Washino ...................... | 348/626 |
| 5,420,645 A | * | 5/1995 | Traa et al. ................... | 348/626 |
| 5,587,745 A | * | 12/1996 | Griepentrog et al. ....... | 348/626 |
| 5,600,381 A | * | 2/1997 | Griepentrog ................ | 348/626 |
| 5,619,279 A | * | 4/1997 | Vacher et al. ............... | 348/626 |
| 6,407,519 B1 | * | 6/2002 | Sakurai ....................... | 315/371 |

FOREIGN PATENT DOCUMENTS

EP 0723365 A1 7/1996 ............ H04N 3/32

OTHER PUBLICATIONS

Patent Abstracts of Japan, No. 63-123275, May 27, 1988, "Outline Correcting Device for Video".
Patent Abstracts of Japan, No. 05-037801, Feb. 12, 1993, "High Definition Television Receiver".

* cited by examiner

*Primary Examiner*—John Miller
*Assistant Examiner*—Jean W. Désir

(57) ABSTRACT

An apparatus displays a video signal (VID) by means of a scan (SCAN). The apparatus may be, for example, a television set. The apparatus comprises a device (SCAVEM) for modulating the scanning rate (Vscan) as a function of the derivative (DLUM) of a luminance signal (LUM) extracted from the video signal (VID). This enables the subjective display quality to be improved. The apparatus has the following characteristic feature in order to obtain an even better quality, notably when the apparatus is used for displaying video signals of different types. The derivative (DLUM) of the luminance signal, as a function of which the scanning rate (Vscan) is modulated, is obtained by means of a differentiator circuit (DIFF) having a controllable frequency response (CFR).

20 Claims, 3 Drawing Sheets

DISPLAY OF A VIDEO SIGNAL BY MEANS OF A LINE SCAN

BACKGROUND OF THE INVENTION

This invention relates to the display of a video signal by means of a line scan. The invention can be applied to, for example, a television set having a cathode-ray Lube.

By means of the following technique it is possible to improve the subjective display quality. The scanning rate is modulated as a function of the derivative of a luminance signal extracted from the video signal to be displayed. The derivative will be substantial in the case of a transition in the luminance signal. A transition represents an abrupt change in brightness. In general, this corresponds to a contour of an object forming part of the displayed picture. As a result, the scanning rate will change to comparatively great extent close to a contour. This provides a more clean-cut appearance of the contour, which contributes to the subjective quality of the picture.

A device for modulating the scanning rate typically comprises a differentiator circuit. The differentiator circuit serves to supply the derivative of the luminance signal as a function of which the scanning rate is modulated. The differentiator circuit may comprise, for example, a capacitance arranged in the following manner. One electrode of the capacitance receives three color components of the video signal, red, green and blue, via respective resistors. Thus, this electrode receives a mixture of the color components, which mixture forms a luminance signal. The other electrode of the capacitance is coupled to an input of a transistor stage. Thus, transistor stage supplies the derivative of the luminance signal. Such a device is apparently disclosed in the European patent application published under the number 0 723 365 (applicant's file number: PHF 95.601).

SUMMARY OF THE INVENTION

It is an object of the invention to enable an even better subjective display quality to be obtained.

According to the invention, the derivative of the luminance signal, as a function of which the scanning rate is modulated, is obtained by means of a differentiator circuit having a controllable frequency response.

The invention takes the following aspects into consideration. A differentiator circuit has a frequency response which is characterized by doubling of its gain per octave. If the frequency response is represented as a logarithmic diagram, this diagram will be characterized by a positive slope of +6 decibels per octave. For an ideal differentiator this positive slope will begin at the frequency "zero" and will continue up to the frequency "infinite". For a practical differentiator circuit this positive slope will generally start at the frequency zero but will stop at a certain frequency. It will be followed by a negative slope, which represents a decrease in gain at increasing frequency. As a result, a differentiator circuit provides a maximum gain at a certain frequency. Hereinafter, this frequency will be referred to as the peak frequency.

The peak frequency of the differentiator circuit influences the subjective display quality. Let it be assumed that the peak frequency is substantially higher than the cutoff frequency of the luminance signal. In that case, the differentiator circuit will have a higher gain for the signal components above the cut-off frequency of the luminance signal. These signal components represent noise. Consequently, the derivative of the luminance signal will be comparatively noisy. Since the scanning rate is modulated as a function of this derivative this modulation will be less accurate and rather at random. This will affect the display quality. The display quality may even be worse than in the case of display without scanning rate modulation.

Let it now be assumed that the peak frequency is substantially lower than the cut-off frequency of the luminance signal. In this case, the components of the video signal near the cut-off frequency will contribute to a relatively smaller extent to the speed modulation. However, these are the components which to an appreciable extent define the contours in the picture to be displayed. Therefore, the scanning rate modulation will enhance the contours to a small extent only. More serious is the fact that the modulation will be determined primarily by components associated with more gradual luminance variations. This may give rise to less natural display effects.

In principle, it is possible to design a differentiator circuit which enables a satisfactory result to be achieved by means of the scanning rate modulation. Such a differentiator circuit will have a frequency response in which the peak frequency lies sufficiently close to the cut-off frequency of the luminance signal.

However, the following problem arises when different video signals are to be displayed. The cut-off frequency of one video signal may differ from the cut-off frequency of another video signal. For example, the cut-off frequency of conventional video signal is approximately 5 MHz. The cut-off frequency of a high-definition television signal is higher, for example, 8 MHz. On the other hand, the cut-off frequency of a video signal obtained from a normal video recorder is comparatively low, typically 3 MHz. A device for displaying these different types of video signals includes a differentiator circuit having a peak frequency of 5 MHz. Actually, this is a compromise. In the case that a conventional television signal is displayed the scanning rate modulation will provide a result which is very close to optimum. In the case that a high-definition television signal is displayed the result may be acceptable. Nevertheless, the result will be comparatively far from optimum for the reasons described hereinbefore. The same applies in the case of a video signal obtained from a normal video recorder.

It has already been stated that, in accordance with the invention, the derivative of the luminance signal, as a function of which the scanning rate is modulated, is obtained by means of a differentiator circuit having a controllable frequency response.

The invention thus enables the frequency response of the differentiator circuit to be controlled. Consequently, the invention enables the peak frequency of the differentiator circuit to be shifted when the type of video signal changes. In this way, the peak frequency of the differentiator circuit can be positioned correctly with respect to the cut-off frequency of the luminance signal for video signals of different types. Thus, the derivative of the luminance signal will exhibit comparatively little noise and, at the same time, the components associated with the contours will contribute appreciably to the derivative. As a result, the scanning rate will be modulated in a comparatively accurate manner and the modulation will primarily take place close to the contours. The invention consequently enables an even better subjective display quality to be achieved.

These as well as other aspects of the invention will be described in greater detail with reference to the Figures.

The following remarks relate to the reference signs. Similar entities bear identical reference letters in all the Figures. A plurality of similar entities may appear in a single Figure. In that case a numeral is suffixed to the reference letters in order to distinguish between similar entities. The numeral or suffix may be omitted for convenience. This applies both to the description and to the claims.

Figure 1:
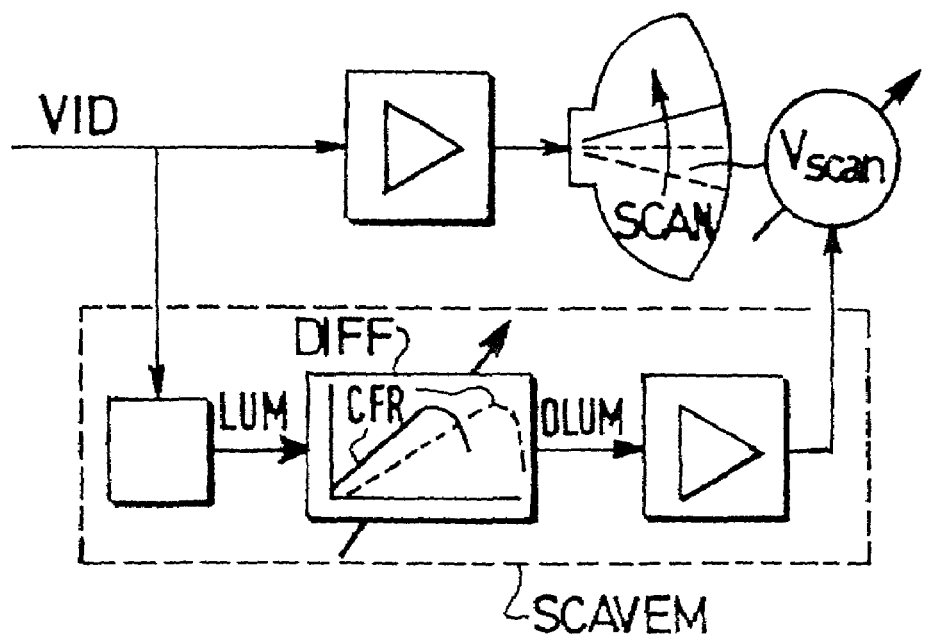
FIG. 1 is a conceptual diagram which illustrates basic characteristic features described hereinbefore.

FIG. 1 shows basic characteristic features described hereinbefore. An apparatus displays a video signal (VID) by means of a scan (SCAN). The apparatus includes a device (SCAVEM) for modulating the scanning rate (Vscan) as a function of a derivative (DLUM) of a luminance signal (LUM) extracted from the video signal (VID). The derivative (DLUM) of the luminance signal, as a function of which the scanning rate (Vscan) is modulated, is obtained by means of a differentiator circuit (DIFF) having a controllable frequency response (CFR).

As regards the characteristic features illustrated in FIG. 1 the following aspects are taken into consideration. It is possible to provide the apparatus shown in FIG. 1 with a control button for adjusting the frequency response of the differentiator circuit. In this way, a user could vary this frequency response until a setting is found for which he deems the display quality to be optimum. This solution thus enables a personalized setting to be obtained. However, it requires additional intervention by the user. Most people already consider electrical apparatuses to be very complicated to use.

Figure 2:
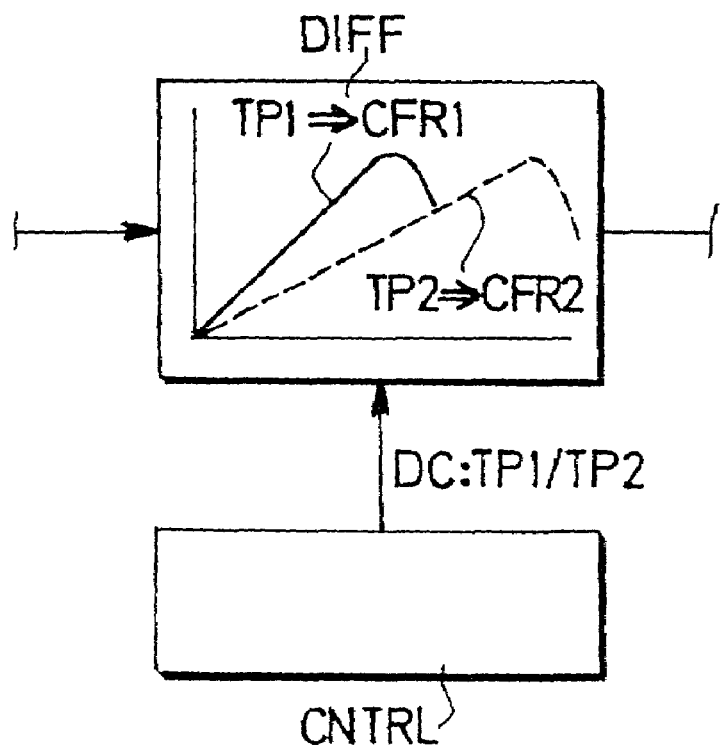
FIGS. 2, 3 are conceptual diagrams which illustrate additional characteristic features.

FIG. 2 illustrates additional characteristic features as compared with FIG. 1. The apparatus includes a control device (CNTRL) for supplying a control signal (DC) indicative of the type (TP) of video signal. The differentiator circuit (DIFF) is adapted to change its frequency response (CFR) in accordance with the control signal (DC).

The additional characteristic features illustrated in FIG. 2 thus enable an automatic adjustment of the frequency response of the differentiator circuit. This contributes to the ease of use of the relevant apparatus. The additional characteristic features illustrated in FIG. 2 thus enable greater customer satisfaction to be achieved.

As regards the additional characteristic features illustrated in FIG. 2 the following is to be observed. A control signal indicative of the type of video signal can be obtained in a comparatively cheap manner. Most modern television sets include a microprocessor. This microprocessor is generally employed in the selection of a video source, for example, a tuner, a video recorder, a set-top box. Moreover, the microprocessor may be involved in a parameterization of the video signal processing. Owing to these functions the microprocessor in fact knows the type of video signal. It is therefore comparatively easy to achieve that it supplies a control signal indicative of the type of video signal. It is also easy to derive such a signal from control signals for the source selection and for the parameterization of the processing.

As regards the characteristic features illustrated in FIG. 1 the following aspects are also considered. An important aspect of an adjustment of the frequency response is the shift of the frequency at which the gain of the differentiator circuit is maximal. This frequency has already been referred to as the peak frequency in the section "Summary of the invention". There are several methods of realizing a differentiator circuit having a peak frequency that can be shifted. For example, the differentiator circuit may include an arrangement of adjustable impedances. However, such a circuit will be comparatively complicated or the adjustment of such a circuit will be comparatively complicated, or even both of these factors may be complicated.

Figure 3:
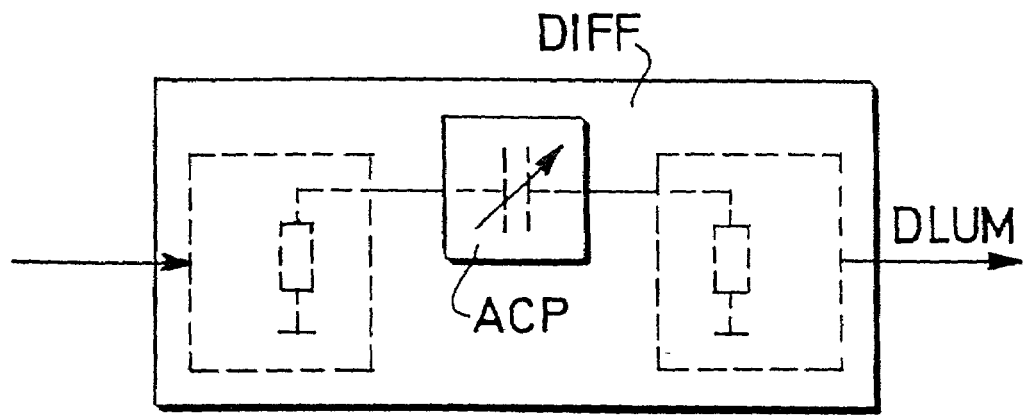

FIG. 3 illustrates the additional characteristic features as compared with FIG. 1. The differentiator circuit (DIFF) has an adjustable capacitive path (ACP) by means of which the derivative (DLUM) of the luminance signal is chiefly obtained. It is evident that the adjustable capacitive path (ACP) forms a capacitance of variable magnitude between the two ends of this path.

The peak frequency is mainly determined by a time constant formed by the capacitive path and the impedance at each end of this capacitive path: a source impedance and a load impedance. Consequently, the peak frequency will be shifted by an adjustment of the capacitive path. Realizing a capacitive path is comparatively easy and adjusting such a path is also comparatively easy. As a result of this, the characteristic features illustrated in FIG. 3 can be realized at low cost.

Another advantage of the additional characteristic features illustrated in FIG. 3 resides in the following aspects. It is desirable that the peak frequency is comparatively high for a high-definition video signal and is low for a signal of medium definition. This has already been explained hereinbefore in the section "Summary of the invention".

A high-definition signal represents the contours accurately while a signal of medium definition represents the contours less accurately. As a result of this, it is desirable that the scanning rate modulation be comparatively weak for a high-definition video signal and be comparatively strong for a video signal of medium definition. The magnitude of the scanning rate modulation depends, inter alia, on the differentiator constant of this differentiator circuit. This constant determines the gain at a given frequency in the video signal spectrum. This gain decreases as the scanning rate modulation diminishes.

Thus, in summary, it is desirable that the peak frequency is high and the differentiator constant is small for a high-definition signal. Conversely, it is desirable that the peak frequency is low and the differentiator constant is large for a medium-definition signal.

Referring now to FIG. 3, a reduction of the capacitance of the adjustable capacitive path (ACP) causes the peak frequency to increase and, at the same time, the differentiator time constant to decrease. conversely, an increase of the capacitance of the adjustable capacitive path (ACP) causes the peak frequency to decrease and, at the same time, the differentiator time constant to increase. consequently, the characteristic features illustrated in FIG. 3 can be realized simply in order to display video signals of different types with a satisfactory quality.

The characteristic features illustrated in FIGS. 1–3 can be used in, for example, a television set. Most television sets use a cathode-ray tube for displaying a video signal. The cathode-ray tube includes a cathode which generates one or more electron beams whose intensity varies in accordance with the video signal. The electron beam impinges at a given spot on a phosphor screen. The point of incidence depends on magnetic conditions. These are varied by means of deflection signals applied to a system of coils, in such a manner that the electron beam scans the phosphor screen in a line by line fashion.

Figure 4:
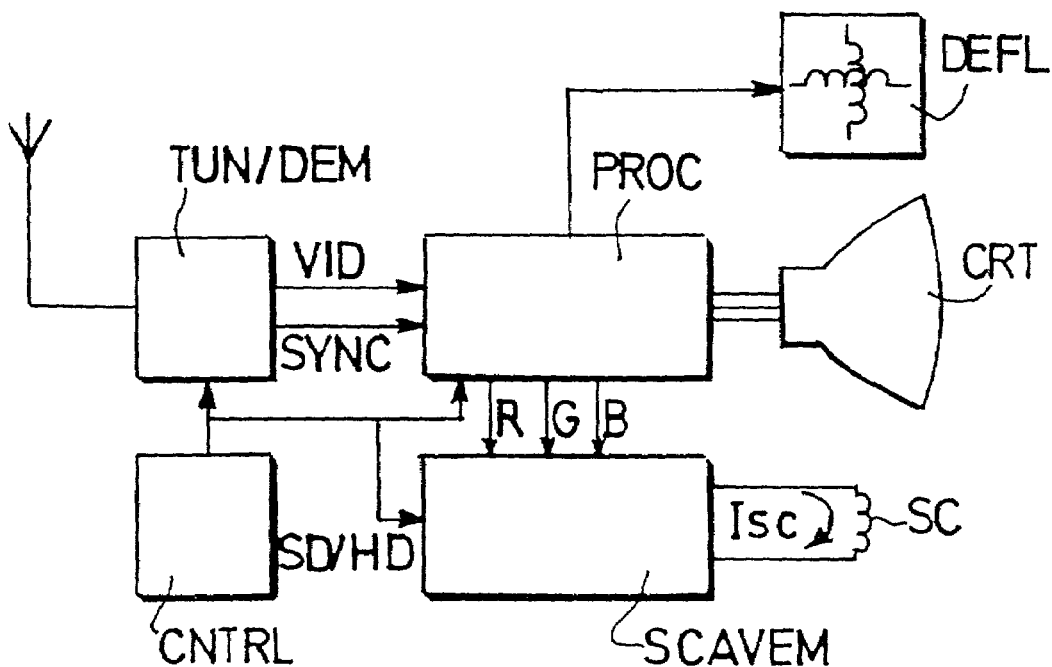
FIG. 4 is a block diagram which shows a television set including a circuit for modulating the scanning rate in a display process.

FIG. 4 shows a television set. The television set includes a tuning and demodulation device (TUN/DEM), a video processor (PROC), a cathode-ray tube (CRT), a system of deflection coils (DEFL), a controller (CNTRL), a circuit for modulating the scanning rate (SCAVEM), and an additional deflection coil (SC).

The general operation of the television set is as follows. The tuning device receives a transmitted television signal (RF), from which it derives a video signal (VID) and synchronization signals (SYNC). The video processor (PROC) processes these different signals in order to apply cathode signals to the cathode-ray tube (CRT) and deflection signals to the system of deflection coils (DEFL). Moreover, the video processor (PROC) applies a red signal (R), a green signal (G) and a blue signal (B) to the circuit for modulating the scanning rate (SCAVEM). The controller (CNTRL) applies control signals to different functional units of the television set. Furthermore, it applies a control signal (SD/HD) to the device for modulating the scanning rate (SCAVEM). This signal indicates whether the transmitted television signal (RF) has a high definition or a medium definition.

The circuit for modulating the scanning rate (SCAVEM) combines the red signal (R), a the green signal (G) and the blue signal (B) so as to obtain a luminance signal. It applies a modulating current (The) to the additional deflection coil (SC) in response to transitions in this luminance signal. The effect of this is that the scanning rate changes close to the contours in the displayed picture.

Figure 5:
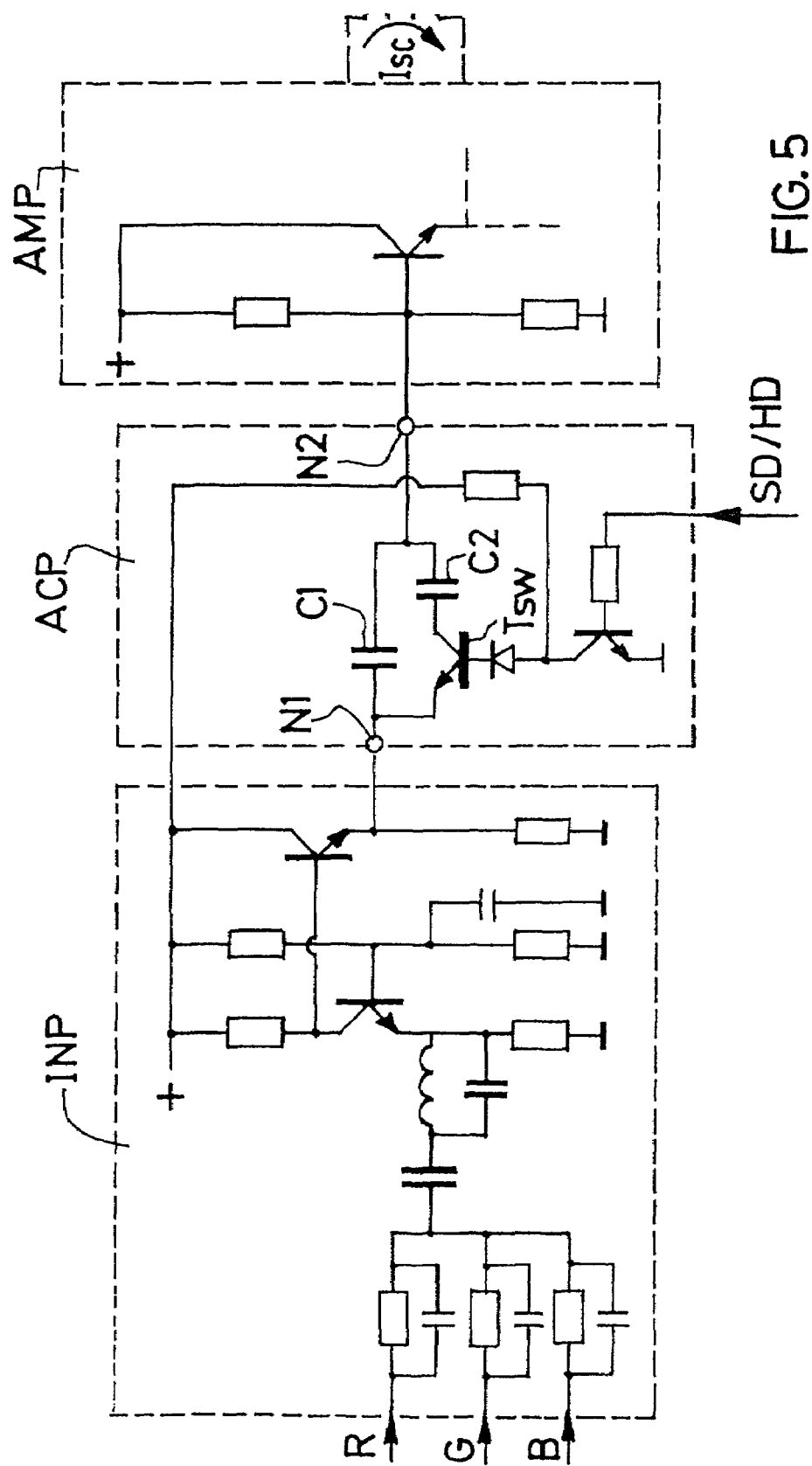
FIG. 5 is a diagram which shows the circuit for modulating the scanning rate.

FIG. 5 shows the circuit for modulating the scanning rate (SCAVEM) in greater detail. The circuit has an input (INP), an adjustable capacitive path (ACP) and an output amplifier (AMP). The adjustable capacitive path (ACP) comprises a main capacitance (C1), an additional capacitance (C2) and a switching transistor (Tsw). These elements are arranged between a input terminal (N1) and an output terminal (N2). Between these terminals (N1, N2) a certain capacitance exists. Hereinafter, this capacitance will be referred to as the differentiator capacitance.

The adjustable capacitive path (ACP) and the input impedance of the output amplifier (AMP) form a differentiator voltage divider. The differentiator constant depends, inter alia, on the differentiator capacitance associated with the adjustable capacitive path (ACP). The frequency at which the gain of the circuit for modulating the scanning rate (SCAVEM) will be maximal, i.e. the peak frequency, also depends on the differentiator capacitance.

The circuit for modulating the scanning rate (SCAVEM) operates as follows. The input (INP) combines the red signal (R), the green signal (G) and the blue signal (B). Thus, the luminance signal will be present on the input terminal (N1) of the adjustable capacitive path (ACP). This luminance signal is applied to the differentiator voltage divider formed by the adjustable capacitive path (ACP) and the input impedance of the output amplifier (AMP). As a result, a derivative of the luminance signal will be present on the output terminal (N2) of the adjustable capacitive path (ACP). The output amplifier (AMP) amplifies this derivative of the luminance signal and applies it to the additional deflection coil (SC) as a current (Isc).

The control signal (SD/HD) is a comparatively low voltage in the case of a medium-definition video signal. The switching transistor (Tsw) is then conductive and in fact forms a short-circuit. As a result, the differentiator capacitance will be substantially equal to the sum of the main capacitance (C1) and the additional capacitance (C2). The differentiator constant will be comparatively large and the peak frequency will be comparatively low.

Conversely, the control signal (SD/HD) is a comparatively high voltage in the case of a high-definition video signal. The switching transistor (Tsw) is then non-conductive and in fact forms an open circuit. As a result, the differentiator capacitance will be substantially equal to the main capacitance (C1). The differentiator constant will be comparatively small and the peak frequency will be comparatively high.

The above description with reference to the Figures illustrates rather than limits the invention. It is evident that there are numerous alternatives within the scope of the appended claims. In conclusion, some remarks are made in this respect.

There are numerous methods of realizing a differentiator circuit having a controllable frequency response. FIG. 5 merely shows one possibility, in which an additional capacitance is switched so as to be in parallel with or not in parallel with a main capacitance depending on a control signal. It is likewise possible, for example, to employ a capacitance which is variable in dependence on a direct voltage. Another possibility could be the use of a plurality of switchable additional capacitances. This is another way of selecting one of several frequency response characteristics. Thus, the scanning rate modulation could be optimized for several types of video signals: a video signal from a video recorder, a video signal from an optical disc reader, a video signal from an analog transmission, a video signal from a digital transmission etc.

There are numerous ways of implementing functions by means of items of hardware or software or a combination of the two. In this respect, it is to be noted that the Figures are highly diagrammatic, each Figure representing merely a single embodiment. Thus, although a Figure shows different functions as separate blocks, this does not exclude the possibility that a single item of hardware or software may perform a plurality of functions. This by no means excludes the possibility that a function may be carried out by a set of hardware or software items.

Finally, any reference signs given in parentheses in a claim shall not be construed in a limitative way. The use of the verb "to comprise" does not exclude the presence of any elements or steps other than those defined in a claim. The use of the indefinite article "a" preceding an element or step does not exclude the presence of a plurality of these elements or steps.

What is claimed is:

1. A modulating device for modulating a scanning rate of a scan device operable to display a video signal, the device comprising:
    an input operable to extract a luminance signal from the video signal; and
    a differentiator circuit operable to receive the luminance signal from the input, wherein the differentiator circuit has a controllable frequency response operable to obtain a derivative of the luminance signal, wherein the differentiator circuit is further operable to adjust the controllable frequency response to approximate a cut-off frequency of the luminance signal.

2. The modulating device of claim 1, wherein the input includes means for combining at least two color components of the video signal.

3. The modulating device of claim 1, further comprising:
a control device operable to communicate a control signal to the differentiator circuit, wherein the control signal is indicative of a type of the video signal and wherein the differentiator circuit is further operable to adjust the controllable frequency response in accordance with the control signal.

4. The modulating device of claim 3, wherein the type of video signal is one from a group including a high-definition video signal and a medium-definition video signal.

5. The modulating device of claim 3, wherein the differentiator circuit includes an adjustable capacitive path operable to adjust the controllable frequency response in accordance with the control signal.

6. The modulating device of claim 5, wherein the adjustable capacitive path includes:
an input terminal;
an output terminal;
a first capacitor permanently connected to the input terminal and the output terminal; and
a second capacitor selectively connected to the input terminal and the output terminal.

7. The modulating device of claim 6,
wherein the adjustable capacitive path further includes a switching transistor;
wherein the switching transistor is operable to connect the second capacitor to the input terminal and the output terminal in response to the control signal indicating the video signal is one of a first set of at least one type of video signal; and
wherein the switching transistor is operable to disconnect the second capacitor from the input terminal and the output terminal in response to the control signal indicating the video signal is one of a second set of at least one type of video signal.

8. The modulating device of claim 7,
wherein the first set of at least one type of video signal includes a medium-definition video signal; and
wherein the second set of at least one type of video signal includes a high-definition video signal.

9. The modulating device of claim 1, further comprising:
an amplifier operable to receive the derivate of the luminance signal from the differentiator circuit, wherein the amplifier is further operable to amplify and apply the derivative or the luminance signal to the scanning rate of the scan device.

10. A video display apparatus, comprising:
a scan device operable to display a video signal in accordance with a scanning rate; and
a modulating device operable to modulate the scanning rate of the scan device the device including;
an input operable to extract a luminance signal from the video signal; and
a differentiator circuit operable to receive the luminance signal from the input wherein the differentiator circuit has a controllable frequency response operable to obtain a derivative of the luminance signal, wherein the differentiator is further operable to adjust the controllable frequency response to approximate a cut-off frequency of the luminance signal.

11. The video display apparatus of claim 10, wherein the input includes means for combining at least two color components of the video signal.

12. The video display apparatus of claim 10, further comprising:
a control device operable to communicate a control signal to the differentiator circuit, wherein the control signal is indicative of a type of the video signal and wherein the differentiator circuit is further operable to adjust the controllable frequency response in accordance with the control signal.

13. The video display apparatus of claim 12, wherein the type of video signal is one from a group including a high-definition video signal and a medium-definition video signal.

14. The video display apparatus of claim 12, wherein the differentiator circuit includes an adjustable capacitive path operable to adjust the controllable frequency response in accordance with the control signal.

15. The video display apparatus of claim 14, wherein the adjustable capacitive path includes:
an input terminal;
an output terminal;
a first capacitor permanently connected to the input terminal and the output terminal; and
a second capacitor selectively connected to the input terminal and the output terminal.

16. The video display apparatus of claim 15,
wherein the adjustable capacitive path further includes a switching transistor;
wherein the switching transistor is operable to connect the second capacitor to the input terminal and the output terminal in response to the control signal indicating the video signal is one of a first set of at least one type of video signal; and
wherein the switching transistor is operable to disconnect the second capacitor from the input terminal and the output terminal in response to the control signal indicating the video signal is one of a second set of at least one type of video signal.

17. The video display apparatus of claim 16,
wherein the first set of at least one type of video signal includes a medium-definition video signal; and
wherein the second set of at least one type of video signal includes a high-definition video signal.

18. The video display apparatus of claim 10,
wherein the scan device includes a plurality of deflection coils, and
wherein the device further includes an amplifier operable to receive the derivate of the luminance signal from the differentiator circuit, wherein the amplifier is further operable to amplify and apply the derivative of the luminance signal to a first deflection coil of the plurality of deflection coils.

19. A modulating device for modulating a scanning rate of a scan device operable to display a video signal, the device comprising:
an input operable to extract a luminance signal from the video signal;
a differentiator circuit operable to receive the luminance signal from the input, wherein the differentiator circuit has a controllable frequency response operable to obtain a derivative of the luminance signal;
a control device operable to communicate a control signal to the differentiator circuit;
wherein the control signal is indicative of a type of the video signal and wherein the differentiator circuit is further operable to adjust the controllable frequency response in accordance with the control signal;
wherein the differentiator circuit includes an adjustable capacitive path operable to adjust the controllable frequency response in accordance with the control signal;
wherein the adjustable capacitive path includes an input terminal, an output terminal, a first capacitor permanently connected to the input terminal and the output terminal, and a second capacitor selectively connected to the input terminal and the output terminal; and wherein the adjustable capacitive path further includes a switching transistor operable to connect the second capacitor to the input terminal and the output terminal in response to the control signal indicating the video signal is one of a first set of at least one type of video signal and further operable to disconnect the second capacitor from input terminal and the output terminal in response to the control signal indicating the video signal is one of a second set of at least one type of video signal.

20. The modulating device of claim 19, wherein the first set of at least one type of video signal includes a medium-definition video signal; and wherein the second set of at least one type of video signal includes a high-definition video signal.

\* \* \* \* \*